(12) United States Patent
Ito

(10) Patent No.: US 7,428,951 B2
(45) Date of Patent: Sep. 30, 2008

(54) BRAKE DEVICE FOR ELEVATOR

(75) Inventor: Kazumasa Ito, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 157 days.

(21) Appl. No.: 10/582,767

(22) PCT Filed: Aug. 19, 2004

(86) PCT No.: PCT/JP2004/011919

§ 371 (c)(1), (2), (4) Date: Jun. 13, 2006

(87) PCT Pub. No.: WO2006/018884

PCT Pub. Date: Feb. 23, 2006

(65) Prior Publication Data

US 2007/0170004 A1    Jul. 26, 2007

(51) Int. Cl.
  *B66B 11/08* (2006.01)
(52) U.S. Cl. .......................... 188/69; 188/31
(58) Field of Classification Search .............. 187/254, 187/393, 287; 188/170, 171, 31, 69
  See application file for complete search history.

(56) References Cited

U.S. PATENT DOCUMENTS 3,610,342 A * 10/1971 Stainken .................... 177/147
4,526,252 A * 7/1985 Hirano ...................... 187/254
4,923,055 A * 5/1990 Holland ..................... 187/287
5,109,958 A * 5/1992 Kato et al. .................. 187/254
5,233,139 A * 8/1993 Hofmann ................... 187/393
5,578,801 A * 11/1996 Hofmann ................... 187/393
5,944,150 A * 8/1999 Hikari ....................... 188/161
6,520,299 B2 * 2/2003 Rimann et al. ............. 188/171
7,104,367 B2 * 9/2006 Ferrand et al. ............. 188/170
2006/0151254 A1 * 7/2006 Sevilleja-Perez et al. .... 187/351

FOREIGN PATENT DOCUMENTS

| JP | 2-106590 | 4/1990 |
| JP | 5-147890 | 6/1993 |
| JP | 07-509212 | 10/1995 |

* cited by examiner

*Primary Examiner*—Christopher P Schwartz
(74) *Attorney, Agent, or Firm*—Oblon, Spivak, McClelland, Maier & Neustadt, P.C.

(57) ABSTRACT

In a braking device for an elevator, a sheave around which main ropes for suspending a car and a counterweight are looped is provided with a pressing device. A braking disc provided with a plurality of engaging portions is pressed against the sheave by the pressing device. An engaging device has a movable portion that can be displaced between an engagement position corresponding to engagement with the engaging portions and a release position corresponding to release from the engaging portions. The braking disc can rotate together with the sheave when the movable portion is at the release position. The braking disc is stopped to brake rotation of the sheave when the movable portion is at the engagement position.

7 Claims, 4 Drawing Sheets

BRAKE DEVICE FOR ELEVATOR

TECHNICAL FIELD

The present invention relates to a braking device for an elevator, for braking raising and lowering of a car and a counterweight.

BACKGROUND ART

Conventionally, there has been proposed a brake for an elevator which grips main ropes for suspending a car of the elevator so as to brake the car when the speed of the car becomes abnormal. The conventional brake for the elevator is provided in an upper portion of a hoistway. The conventional brake for the elevator has a pair of brake shoes, which sandwich the main ropes therebetween to grip the main ropes. Gripping forces applied to the main ropes from the brake shoes are maintained by a plurality of springs (see Patent Document 1).

Patent Document 1: JP 07-509212 A

DISCLOSURE OF THE INVENTION

Problems to be solved by the Invention

However, in a conventional brake for an elevator, main ropes are directly gripped so as to brake running of a car. Therefore, the main ropes are seriously damaged and thus substantially reduced in life.

The conventional brake for the elevator has a pair of the brake shoes for gripping the main ropes, springs, and the like, so a structural complication and an increase in size are incurred. Consequently, an increase in installation space for the brake for the elevator is caused.

The present invention has been made to solve the aforementioned problems, and it is therefore an object of the present invention to obtain a braking device for an elevator, capable of allowing reduction in installation space while ensuring a prolonged life of main ropes.

Means for Solving the Problems

A braking device for an elevator according to the present invention, includes: a pressing device provided on a sheave, which is rotated by raising and lowering a car and a counterweight, for applying a pressing force toward the sheave; a braking disc provided with a plurality of engaging portions along a rotational direction of the sheave, for being pressed against the sheave by the pressing device; and an engaging device having a movable portion that can be displaced between an engagement position corresponding to engagement with the engaging portions and a release position corresponding to release from the engaging portions, in which: the braking disc can rotate together with the sheave when the movable portion is at the release position; and the braking disc is stopped to brake rotation of the sheave when the movable portion is at the engagement position.

BEST MODE FOR CARRYING OUT THE INVENTION

In the following, a preferred embodiment of the present invention is described with reference to the drawings.

Embodiment 1

Figure 1:
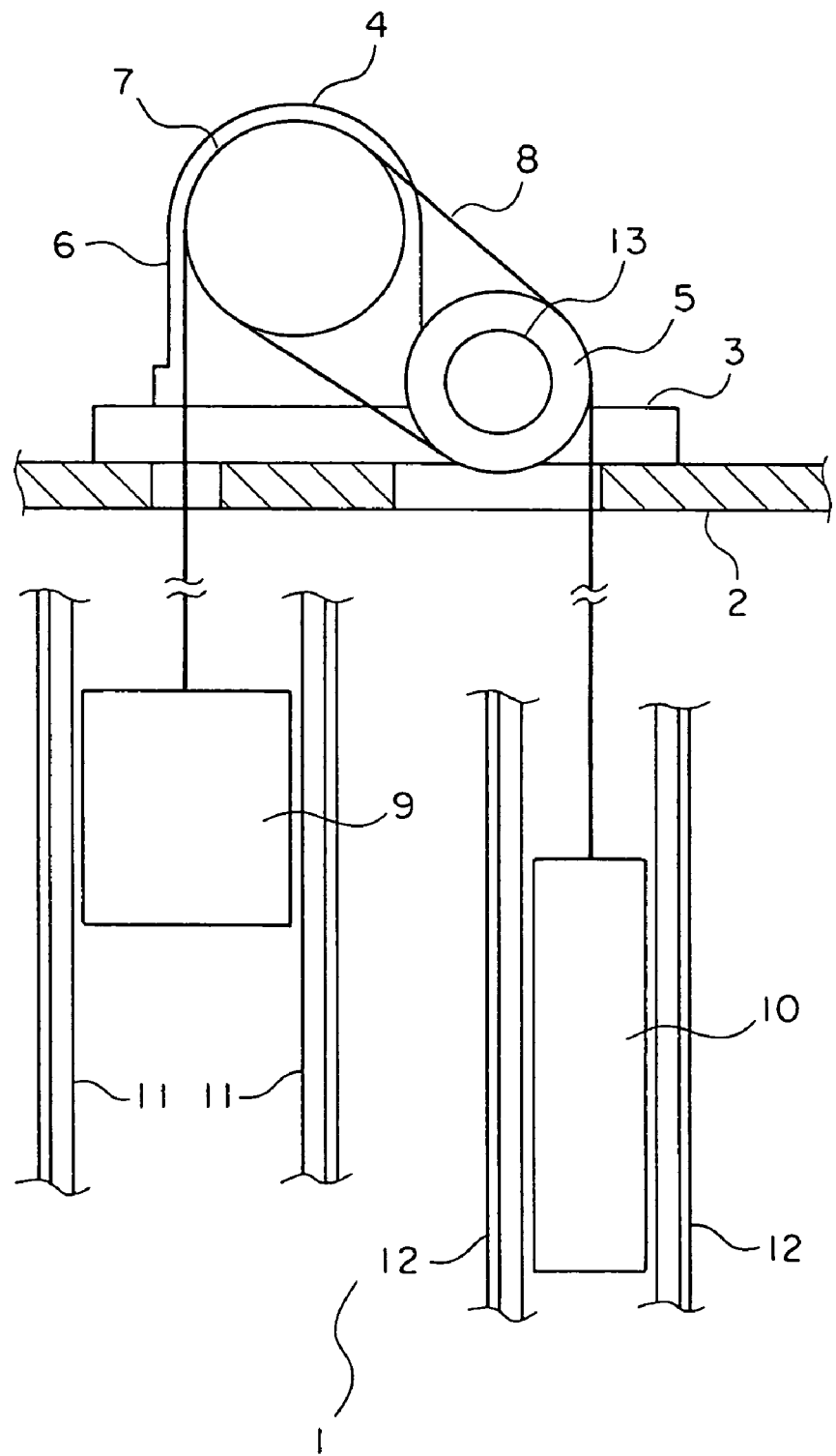
FIG. 1 is a vertical sectional view of an elevator according to Embodiment 1 of the present invention.

FIG. 1 is a vertical sectional view of an elevator according to Embodiment 1 of the present invention. In the figure, in an upper portion of a hoistway 1, a horizontal beam 2 extending horizontally is provided. On the horizontal beam 2, a pair of hoisting machine pedestals 3 which are support platforms arranged in parallel to each other are fixed. On the hoisting machine pedestals 3, a hoisting machine 4 which is a drive device and a deflector sheave 5 which is a sheave arranged away from the hoisting machine 4 are supported.

The hoisting machine 4 includes a drive device body 6 having a motor, and a drive sheave 7 which is caused to rotate by the drive device body 6. A plurality of main ropes 8 are looped around the drive sheave 7 and the deflector sheave 5.

A car 9 and a counterweight 10 are suspended by the main ropes 8. The main ropes 8 extend from the car 9, are looped around the drive sheave 7 and the deflector sheave 5 in the stated order and then around the drive sheave 7 and the deflector sheave 5 in the stated order again, and reach the counterweight 10. In other words, the main ropes 8 are looped around the drive sheave 7 and the deflector sheave 5 according to a full-wrap roping system (a double-wrap roping system).

The car 9 and the counterweight 10 are raised and lowered within the hoistway 1 through rotation of the drive sheave 7 caused by the drive device body 6. A pair of car guide rails 11 for guiding the car 9 during raising and lowering of the car 9 and a pair of counterweight guide rails 12 for guiding the counterweight 10 during raising and lowering of the counterweight 10 are installed within the hoistway 1. An emergency stop device (not shown) for gripping the car guide rails 11 to prevent the car 9 from falling is mounted on the car 9.

The deflector sheave 5 is provided with a deflector sheave braking device 13 (hereinafter referred to simply as "braking device 13") as a braking device for braking rotation of the deflector sheave 5. The hoisting machine 4 is provided with a hoisting machine braking device (not shown) for braking rotation of the drive sheave 7.

Figure 2:
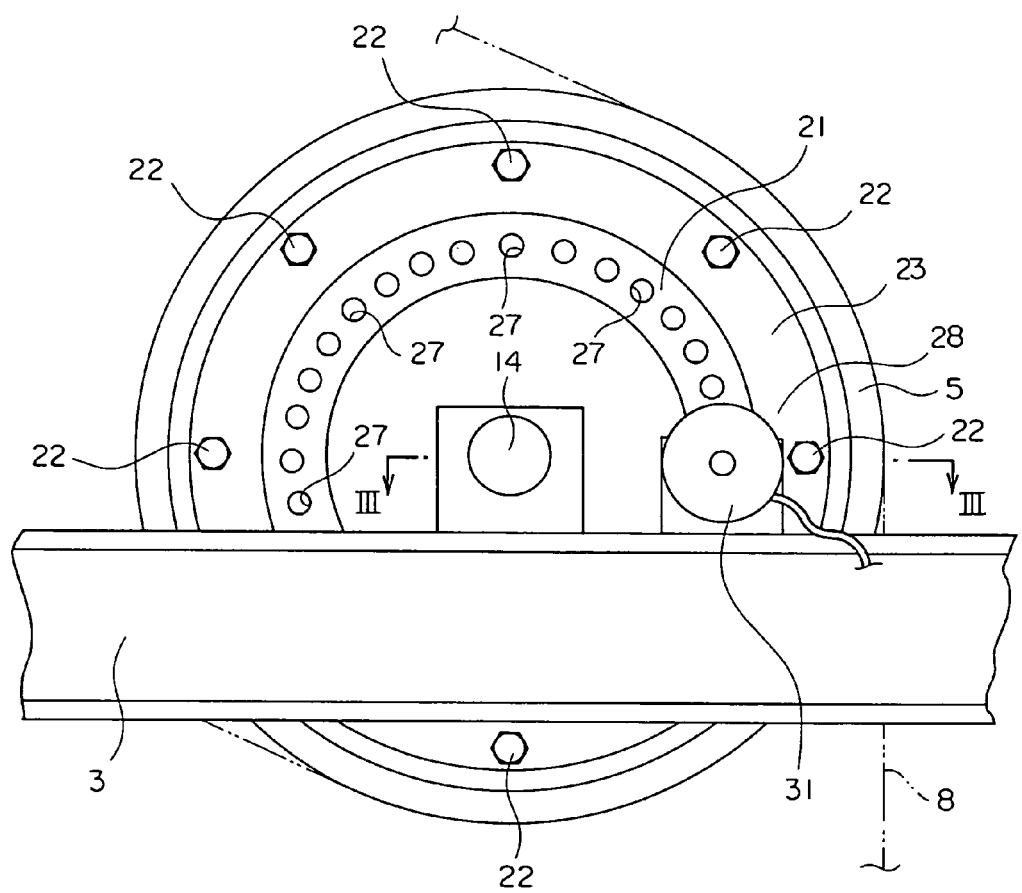
FIG. 2 is a front view showing the deflector sheave and the braking device of FIG. 1.
Figure 3:
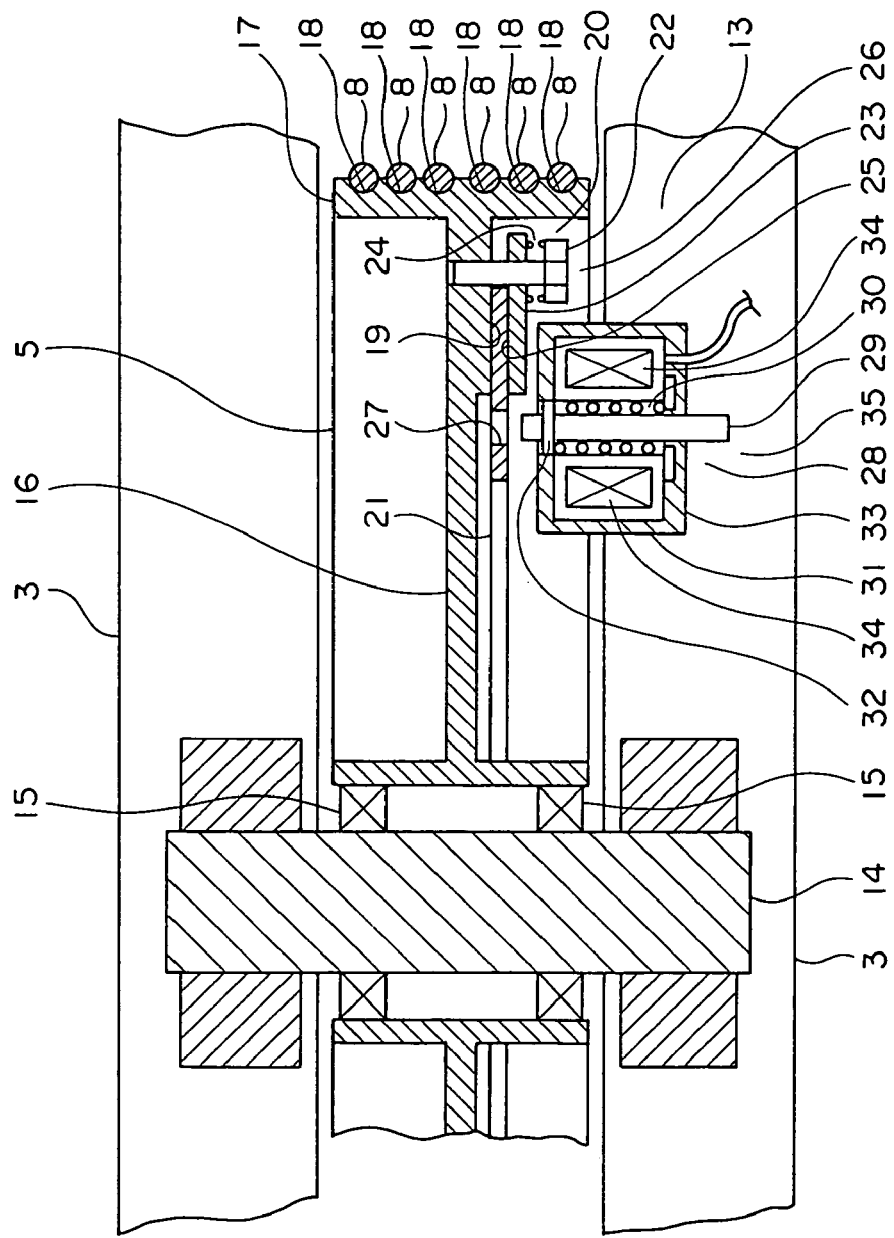
FIG. 3 is a sectional view taken along the line III-III of FIG. 2.
Figure 4:
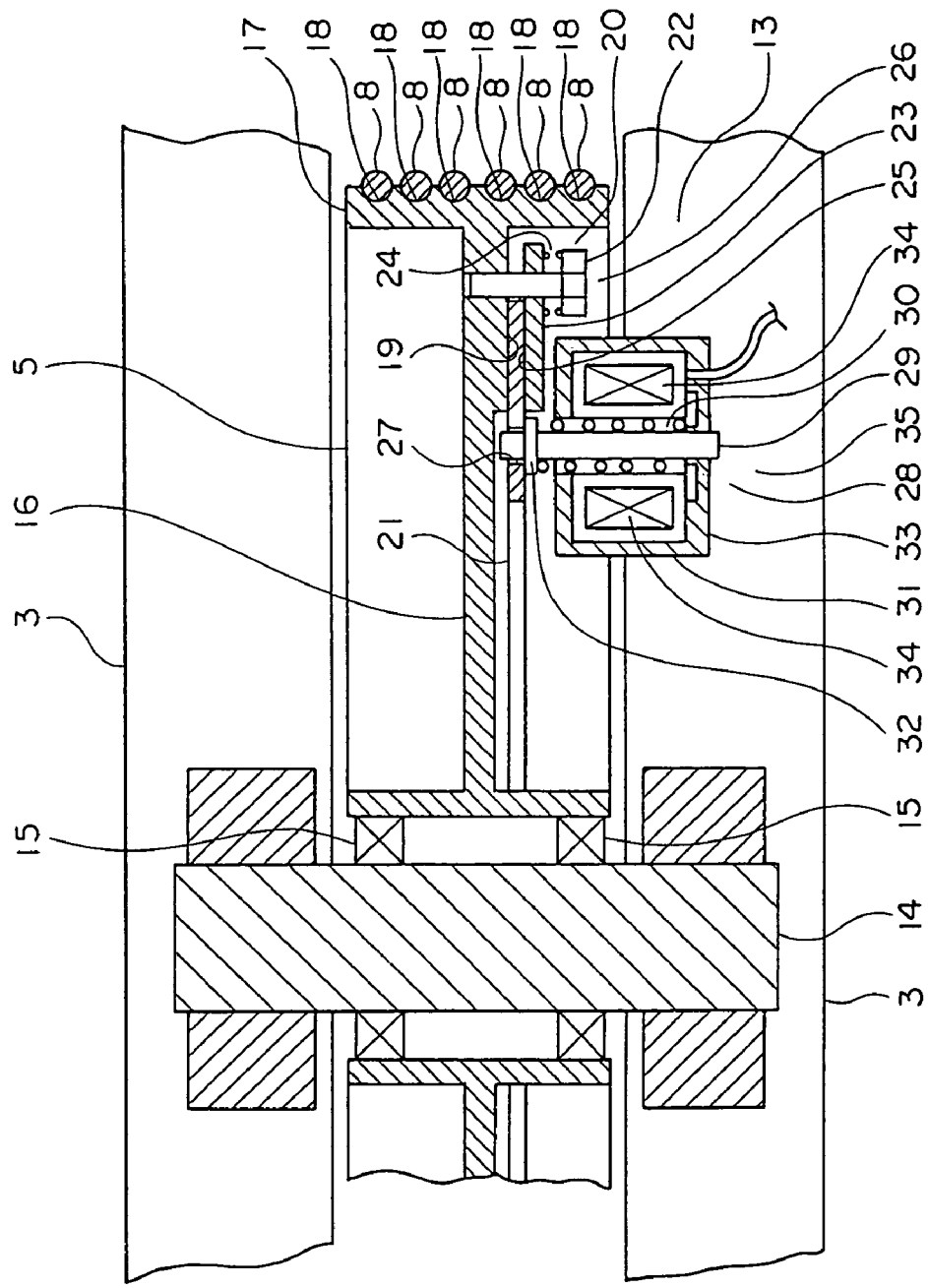
FIG. 4 is a sectional view showing a state in which the braking device of FIG. 3 is in operation.

FIG. 2 is a front view showing the deflector sheave 5 and the braking device 13 of FIG. 1. FIG. 3 is a sectional view taken along the line III-III of FIG. 2. In addition, FIG. 4 is a sectional view showing a state in which the braking device 13 of FIG. 3 is in operation. Referring to the figures, the deflector sheave 5 is rotatably provided on a support shaft 14, which is fixed to the hoisting machine pedestals 3, via a bearing 15. The support shaft 14 is disposed on a central axis of the deflector sheave 5. The deflector sheave 5 has a disc-shaped sheave body 16 and an outer ring portion 17 extending along an outer periphery of the sheave body 16. A plurality of groove portions 18 extending in a circumferential direction of the deflector sheave 5 are provided in an outer surface of the outer ring portion 17. Each of the main ropes 8 is looped around the deflector sheave 5 along each of the groove portions 18.

A braking surface 19 extending along a rotational direction of the deflector sheave 5 is provided on a lateral surface of the sheave body 16. The sheave body 16 is provided with a pressing device 20 for applying a pressing force toward the braking surface 19. An annular braking disc 21 is pressed against the braking surface 19 by the pressing device 20.

The pressing device 20 has an adjusting bolt 22, an annular pressing plate 23, and a spring 24. The adjusting bolt 22 is fitted to the sheave body 16. The annular pressing plate 23, which is slidably penetrated by the adjusting bolt 22, sandwiches the braking disc 21 between itself and the braking surface 19. The spring 24, which is compressed between a head portion of the adjusting bolt 22 and the pressing plate 23, serves as an elastic body for applying a pressing force to the pressing plate 23 toward the sheave body 16 through an elastic restoring force.

The pressing force resulting from the spring 24 is applied to the braking disc 21 through the pressing plate 23. The braking disc 21 is thereby pressed against the braking surface 19. The magnitude of the pressing force resulting from the spring 24 can be adjusted by adjusting a screwing amount of the adjusting bolt 22 into the sheave body 16. The pressing plate 23 is provided with a braking surface 25 on which the braking disc 21 is brought into abutment. Each of a plurality of adjusting portions 26 for adjusting a pressing force applied to the braking disc 21 has the adjusting bolt 22 and the spring 24. The plurality of adjusting portions 26 are disposed apart from one another along the circumferential direction of the deflector sheave 5.

The braking disc 21 is an annular plate extending along the braking surface 19. By being pressed against the braking surface 19 by the pressing device 20, the braking disc 21 is held by the deflector sheave 5. The respective adjusting bolts 22 are disposed around the braking disc 21. The braking disc 21 is thereby prevented from slipping off from between the deflector sheave 5 and the pressing plate 23. A plurality of engaging holes 27 as engaging portions, which are arranged apart from one another along the rotational direction of the deflector sheave 5, are provided in the braking disc 21. The engaging holes 27 are provided in a portion radially inwardly of a portion of the braking disc 21 which comes into contact with the braking surface 19 and the braking surface 25.

An engaging device 28 facing the braking disc 21 is provided on the hoisting machine pedestal 3. The engaging device 28 has a plunger 29, an engagement spring 30, and an electromagnet 31 for release. The plunger 29 is a movable portion that can be displaced between an engagement position (FIG. 4) corresponding to engagement with the engaging holes 27 and a release position (FIG. 3) corresponding to release from the engaging holes 27. The engagement spring 30 is an urging portion for urging the plunger 29 in such a direction as to displace the plunger 29 to the engagement position. The electromagnet 31 for release operates to displace the plunger 29 to the release position against the urging of the engagement spring 30.

The plunger 29 is made of a magnetic material. The plunger 29 is displaced to the engagement position by moving forward, and to the release position by moving backward. In addition, the plunger 29 is engaged with the engaging holes 27 respectively by inserting a tip of the plunger 29 into the engaging holes 27 respectively. Moreover, a stopper 32 for regulating an amount of insertion of the plunger 29 into the engaging holes 27 respectively is fixed to the plunger 29.

The electromagnet 31 is slidably penetrated by the plunger 29. The electromagnet 31 has a magnet body 33 made of a magnetic material, and a solenoid coil 34 accommodated in the magnet body 33. By energizing the solenoid coil 34, the plunger 29 is displaced to the release position against the urging of the engagement spring 30. An engaging device body 35 has the engagement spring 30 and the electromagnet 31.

The electromagnet 31 is electrically connected to a control unit (not shown) for controlling operation of the elevator. A car speed sensor (not shown) as a detecting portion for detecting a speed of the car 9 is electrically connected to the control unit. Based on information transmitted from the car speed sensor, the control unit selectively outputs an actuation signal to the hoisting machine braking device, the braking device 13, or the emergency stop device.

That is, a first set over speed higher than a rated speed of the car 9, a second set over speed higher than the first set over speed, and a third set over speed higher than the second set over speed are set in advance as abnormal speeds in the control unit. The control unit outputs an actuation signal to the hoisting machine braking device, the braking device 13, and the emergency stop device when the speed of the car 9 reaches the first set over speed, the second set over speed, and the third set over speed, respectively.

Next, an operation will be described. During normal operation, the plunger 29 has been displaced to the release position through energization of the solenoid coil 34. At this moment, the braking disc 21 can rotate around the support shaft 14 together with the deflector sheave 5.

When the speed of the car 9 reaches the first set over speed, an actuation signal is outputted from the control unit to the hoisting machine braking device. The hoisting machine braking device thereby operates to brake the drive sheave 7.

When the speed of the car 9 reaches the second set over speed, an actuation signal is outputted from the control unit to the braking device 13. Energization of the solenoid coil 34 is thereby stopped. Thus, the plunger 29 is displaced from the release position to the engagement position due to the urging of the engagement spring 30 (FIG. 4). At this moment, the plunger 29 may not be displaced to the engagement position due to abutment of the tip of the plunger 29 on the braking disc 21. However, the braking disc 21 is rotated to cause a positional shift of the engaging holes 27 with respect to the plunger 29, so the plunger 29 is inserted into a corresponding one of the engaging holes 27 and displaced to the engagement position.

Rotation of the braking disc 21 is stopped due to displacement of the plunger 29 to the engagement position. The deflector sheave 5 and the adjusting portions 26 are thereby slid with respect to the braking disc 21. At this moment, the deflector sheave 5 and the adjusting portions 26 are braked by a frictional force between the braking surface 19 and the braking disc 21 and a frictional force between the braking surface 25 and the braking disc 21, respectively.

In addition, when the speed of the car 9 reaches the third set over speed, an actuation signal is outputted from the control unit to the emergency stop device. In response to an input of the actuation signal, the emergency stop device operates to grip the car guide rails 11. The car 9 is thereby braked.

During restoration, the outputting of an actuation signal from the control unit is stopped, and the solenoid coil 34 is energized again. The plunger 29 is thereby attracted by the electromagnet 31 to be displaced from the engagement position to the release position (FIG. 3). The plunger 29 is released from the engaging hole 27 in this manner, so the braking device 13 is restored.

In such the braking device 13, the braking disc 21, through which the plurality of the engaging holes 27 are provided, is pressed against the deflector sheave 5 by the pressing device 20, so the plunger 29 can be displaced between the engagement position corresponding to engagement with the engaging holes 27 and the release position corresponding to release from the engaging holes 27. Therefore, rotation of the deflector sheave 5 can be braked simply by displacing the plunger 29 to the engagement position. Thus, the electromagnet 31 can be made compact, so the entire braking device can be made compact. Accordingly, a reduction in installation space for the braking device 13 can be achieved. The car 9, which can be braked by braking rotation of the deflector sheave 5, is not braked by directly sandwiching the main ropes 8, so the main ropes 8 can be prevented from being damaged. Thus, the life of the main ropes 8 can be prolonged.

The pressing device 20 has the pressing plate 23 for sandwiching the braking disc 21 between itself and the deflector sheave 5 and the adjusting portions 26 for applying a pressing force to the braking disc 21 via the pressing plate 23. Therefore, a frictional force can be generated not only between the braking disc 21 and the deflector sheave 5 but also between the braking disc 21 and the pressing plate 23. As a result, a braking force applied to the deflector sheave 5 by the braking disc 21 can be increased.

The adjusting portions 26 can adjust the magnitude of a pressing force applied to the braking disc 21, so the magnitude of a frictional force between the braking disc 21 and the deflector sheave 5 can be adjusted. As a result, a braking force applied to the deflector sheave 5 by the braking disc 21 can be adjusted.

The deflector sheave 5, which directly receives the weights of the car 9 and the counterweight 10, is provided with the braking device 13, so the car 9 and the counterweight 10 can be more effectively braked by braking the deflector sheave 5.

In the foregoing example, the braking device 13 operates only when the speed of the car 9 becomes abnormal. However, the braking device 13 may also operate when the car 9 is normally stopped at each floor. In this manner, the car 9 can be prevented from being raised and lowered by a great distance, for example, when a passenger gets on or off the car 9. In this case, an actuation signal from the control unit is outputted to the braking device 13 when the car 9 is normally stopped at each floor. The outputting of an actuation signal from the control unit is stopped to restore operation of the braking device 13 immediately before the car 9 starts moving. Even when the plunger 29 abuts on the braking disc 21 and has not been inserted into a corresponding one of the engaging holes 27 completely, insertion of the plunger 29 into the corresponding one of the engaging holes 27 is ensured by vertical movements (vertical wobbles) of the car 9 which are caused when the passenger gets on or off the car 9.

In the foregoing example, the main ropes 8 are looped around the drive sheave 7 and the deflector sheave 5 according to the full-wrap roping system. However, the main ropes 8 maybe looped around the drive sheave 7 and the deflector sheave 5 according to a half-wrap roping system in which the main ropes 8 are looped once around the drive sheave 7.and the deflector sheave 5, respectively. In this case, for the purpose of ensuring the drive sheave 7 of a predetermined traction ability, each of the drive sheave 7 and the deflector sheave 5 is changed in, for example, shape, and V-shaped grooves or undercut grooves as groove portions are formed in the drive sheave 7 and the deflector sheave 5, respectively.

In the foregoing example, the braking device 13 brakes the deflector sheave 5. For example, however, when the car 9 and the counterweight 10 are provided with a car suspension pulley as a sheave and a counterweight suspension pulley as a sheave, respectively, and the main ropes 8 are looped around the car suspension pulley and the counterweight suspension pulley so that the car 9 and the counterweight 10 are suspended by the main ropes 8, the braking device 13 may be provided on at least one of the car suspension pulley and the counterweight suspension pulley.

The invention claimed is:

1. A braking device for an elevator, comprising:
   a pressing device provided on a sheave, which is rotated by raising and lowering a car and a counterweight, configured to apply a pressing force toward the sheave;
   a braking disc provided with a plurality of engaging portions along a rotational direction of the sheave, configured to be pressed against the sheave by the pressing device; and
   an engaging device including a movable portion configured to be displaced between an engagement position corresponding to engagement with the engaging portions and a release position corresponding to release from the engaging portions, wherein
   the braking disc is configured to rotate together with the sheave when the movable portion is at the release position, and
   the braking disc is stopped to brake rotation of the sheave when the movable portion is at the engagement position.

2. A braking device for an elevator according to claim 1, wherein the pressing device includes a pressing plate sandwiching the braking disc between the pressing device and the sheave, and an adjusting portion configured to apply the pressing force to the sheave via the pressing plate and the braking disc while allowing a magnitude of the pressing force to be adjusted.

3. A braking device for an elevator according to claim 1, wherein the sheave is a deflector sheave disposed apart from a drive device configured to raise and lower the car and the counterweight.

4. A braking device for an elevator according to claim 2, wherein the sheave is a deflector sheave disposed apart from a drive device configured to raise and lower the car and the counterweight.

5. The braking device for an elevator according to claim 1, wherein the sheave is configured to rotate around an axis of rotation, and the engaging device is located radially inward of an outermost portion of the sheave as viewed along the axis of rotation.

6. The braking device for an elevator according to claim 1, wherein the braking disc is in direct contact with the sheave while the movable portion is in the release position and when the movable portion is in the engagement position.

7. The braking device for an elevator according to claim 1, wherein the engaging device is disposed on a first side of the braking disc, and the sheave is disposed on a second side of the braking disc opposite the first side.

* * * * *